US012386297B2

(12) United States Patent
Ishida

(10) Patent No.: US 12,386,297 B2
(45) Date of Patent: Aug. 12, 2025

(54) FIXING DEVICE INCLUDING HEATER IN WHICH FIRST AND SECOND RESISTANCE HEATING ELEMENTS ARE POSITIONED APART FROM EACH OTHER ON FIRST SURFACE OF SUBSTRATE BY PREDETERMINED DISTANCE IN CONVEYING DIRECTION

(71) Applicant: BROTHER KOGYO KABUSHIKI KAISHA, Nagoya (JP)

(72) Inventor: Kei Ishida, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 29 days.

(21) Appl. No.: 18/522,522

(22) Filed: Nov. 29, 2023

(65) Prior Publication Data

US 2024/0176269 A1 May 30, 2024

(30) Foreign Application Priority Data

Nov. 30, 2022 (JP) ................................ 2022-190902

(51) Int. Cl.
*G03G 15/20* (2006.01)

(52) U.S. Cl.
CPC ..... *G03G 15/2057* (2013.01); *G03G 15/2064* (2013.01)

(58) Field of Classification Search
USPC .......................................................... 399/333
See application file for complete search history.

(56) References Cited

U.S. PATENT DOCUMENTS

2014/0138372 A1 5/2014 Ogura
2016/0132006 A1* 5/2016 Narahara ........... G03G 15/2053 399/329

FOREIGN PATENT DOCUMENTS

| | | | |
|---|---|---|---|
| JP | 2005149952 | A | 6/2005 |
| JP | 2016090865 | A | 5/2016 |
| JP | 2017194719 | A | 10/2017 |
| JP | 2017199024 | A | 11/2017 |
| WO | WO-2014081045 | A1 | 5/2014 |

* cited by examiner

*Primary Examiner* — Quana Grainger
(74) *Attorney, Agent, or Firm* — Element IP, PLC

(57) ABSTRACT

A fixing device includes a heating rotary body, a pressure rotary body, a heater, and a thermal conductive member. The pressure rotary body is configured to form a nipping portion and to convey a sheet in a conveying direction while nipping the sheet between the pressure rotary body and the heating rotary body. The heater includes a substrate having a first surface and a second surface, and a first and second resistance heating elements provided on the first surface. The first and second resistance heating elements extend in a crossing direction crossing the conveying direction and are positioned apart from each other by a predetermined distance in the conveying direction. The thermal conductive member is in contact with the second surface. In the conveying direction, the thermal conductive member has a dimension greater than the predetermined distance and smaller than or equal to a dimension of the nipping portion.

15 Claims, 7 Drawing Sheets

FIXING DEVICE INCLUDING HEATER IN WHICH FIRST AND SECOND RESISTANCE HEATING ELEMENTS ARE POSITIONED APART FROM EACH OTHER ON FIRST SURFACE OF SUBSTRATE BY PREDETERMINED DISTANCE IN CONVEYING DIRECTION

REFERENCE TO RELATED APPLICATIONS

This application claims priority from Japanese Patent Application No. 2022-190902 filed on Nov. 30, 2022. The entire content of the priority application is incorporated herein by reference.

BACKGROUND ART

There has been conventionally known a fixing device including a rotatable belt, a ceramic heater and a pressure roller. In the conventional fixing device, the ceramic heater and the pressure roller are configured to nip the belt in cooperation with each other. The ceramic heater includes a substrate and a resistance heating element. The ceramic heater has a nip surface in contact with the nip surface, and a back surface that is the opposite surface of the nip surface. A sheet-like thermal conductive member is arranged on the back surface and is in contact with the same. The thermal conductive member is configured to make uniform the temperature of the substrate.

DESCRIPTION

Because the thermal conductive member has a heat capacity, it is desirable to minimize the size of the thermal conductive member in order to efficiently use heat generated by the heater to perform thermal fixing of an image.

In view of the foregoing, it is an object of the present disclosure to provide a fixing device in which the heat distribution of a heater can be made uniform while suppressing a thermal conductive member from removing heat greater than necessary.

In order to attain the above and other objects, the present disclosure provides a fixing device including a heating rotary body, a pressure rotary body, a heater, and a thermal conductive member. The pressure rotary body is configured to: form a nipping portion between the pressure rotary body and the heating rotary body; and convey a sheet in a conveying direction while nipping the sheet between the pressure rotary body and the heating rotary body. The heater is accommodated inside the heating rotary body. The heater includes a substrate, a first resistance heating element, and a second resistance heating element. The substrate has a first surface and a second surface opposite the first surface. The first resistance heating element extends in a crossing direction crossing the conveying direction. The first resistance heating element is provided on the first surface of the substrate. The second resistance heating element extends in the crossing direction. The second resistance heating element is provided on the first surface of the substrate. The second resistance heating element is positioned apart from the first resistance heating element by a predetermined distance in the conveying direction. The thermal conductive member is in contact with the second surface of the substrate. In the conveying direction, the thermal conductive member has a dimension that is greater than the predetermined distance and smaller than or equal to a dimension of the nipping portion.

In the above structure, since in the conveying direction the dimension of the thermal conductive member is greater than the dimension of the predetermined distance and smaller than or equal to the dimension of the nipping portion, the heat distribution of the heater can be made uniform while suppressing the thermal conductive member from removing heat greater than necessary.

According to another aspect, the present disclosure provides a fixing device including a heating rotary body, a pressure rotary body, a heater, and a thermal conductive member. The pressure rotary body is configured to: form a nipping portion between the pressure rotary body and the heating rotary body; and convey a sheet in a conveying direction while nipping the sheet between the pressure rotary body and the heating rotary body. The heater is accommodated inside the heating rotary body. The heater includes a substrate, a first resistance heating element, and a second resistance heating element. The substrate has a first surface and a second surface opposite the first surface. The first resistance heating element extends in a crossing direction crossing the conveying direction. The first resistance heating element is provided on the first surface of the substrate. The second resistance heating element extends in the crossing direction. The second resistance heating element is provided on the first surface of the substrate. The second resistance heating element is positioned apart from the first resistance heating element by a predetermined distance in the conveying direction. The thermal conductive member is in contact with the second surface of the substrate. In the conveying direction, the substrate has a dimension that is greater than a dimension of the nipping portion. In the conveying direction, the dimension of the nipping portion is greater than the predetermined distance and is greater than or equal to a dimension of the thermal conductive member.

According to still another aspect, the present disclosure provides a fixing device including a belt, a pressure roller, a heater, and a thermal conductive plate. The pressure roller is configured to: form a nipping portion between the pressure roller and the belt; and convey a sheet in a conveying direction while nipping the sheet between the pressure roller and the belt. The heater is accommodated inside the belt. The heater includes a substrate, a first resistance heating element, a second resistance heating element. The substrate having a first surface and a second surface opposite the first surface. The first resistance heating element extends in a crossing direction crossing the conveying direction. The first resistance heating element is provided on the first surface of the substrate. The second resistance heating element extends in the crossing direction. The second resistance heating element is provided on the first surface of the substrate. The second resistance heating element is positioned apart from the first resistance heating element by a predetermined distance in the conveying direction. The thermal conductive plate is in contact with the second surface of the substrate. In the conveying direction, the thermal conductive plate has a dimension that is greater than the predetermined distance and smaller than or equal to a dimension of the nipping portion.

In the above structures, the heat distribution of the heater can be made uniform while suppressing the thermal conductive member from removing heat greater than necessary.

Figure 1:
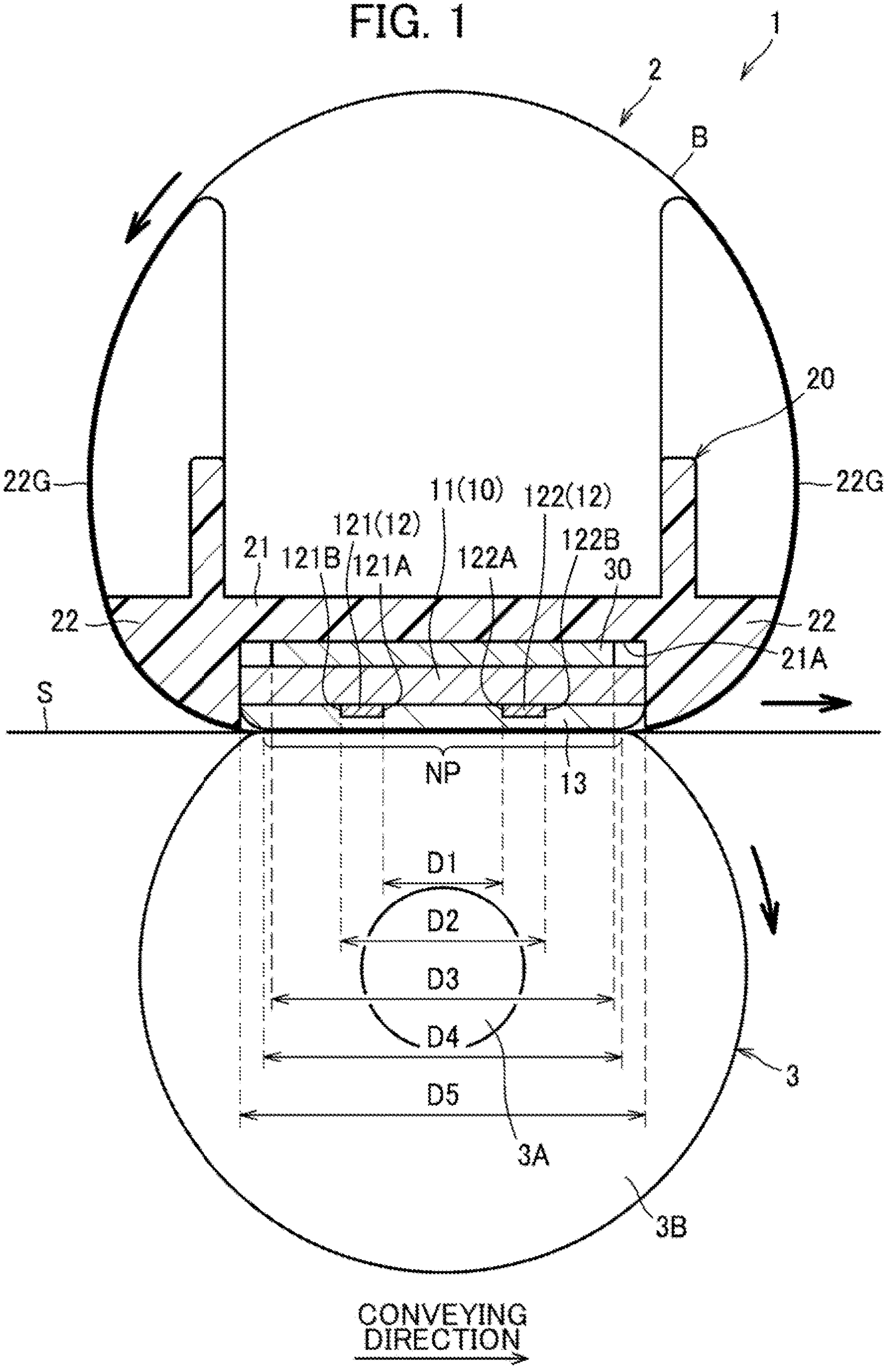
FIG. 1 is a cross-sectional view of a heating unit.

A fixing device 1 according to a first embodiment is used with various apparatuses including an image forming apparatus and a device configured to thermally transfer foil onto a medium. As illustrated in FIG. 1, the fixing device 1 includes a heating unit 2 and a pressure rotary body 3. At least one of the heating unit 2 and the pressure rotary body 3 is urged by an urging mechanism (not illustrated) toward the other of the heating unit 2 and the pressure rotary body 3. The pressure rotary body 3 is an example of the "pressure roller".

The heating unit 2 includes a belt B, a heater 10, a holder 20, and a thermal conductive member 30. The belt B is configured to heat a sheet S by rotating while the sheet S is nipped between the belt B and the pressure rotary body 3. The belt B is an example of the "heating rotary body". The thermal conductive member 30 is an example of the "thermal conductive plate".

The belt B is an endless belt and made of metal or resin. The belt B is configured to rotate around the heater 10 while being guided by the holder 20. The belt B has an outer circumferential surface and an inner circumferential surface. The outer circumferential surface is configured to contact the sheet S to be subjected to heating. The inner circumferential surface is in contact with the heater 10.

Figure 2:
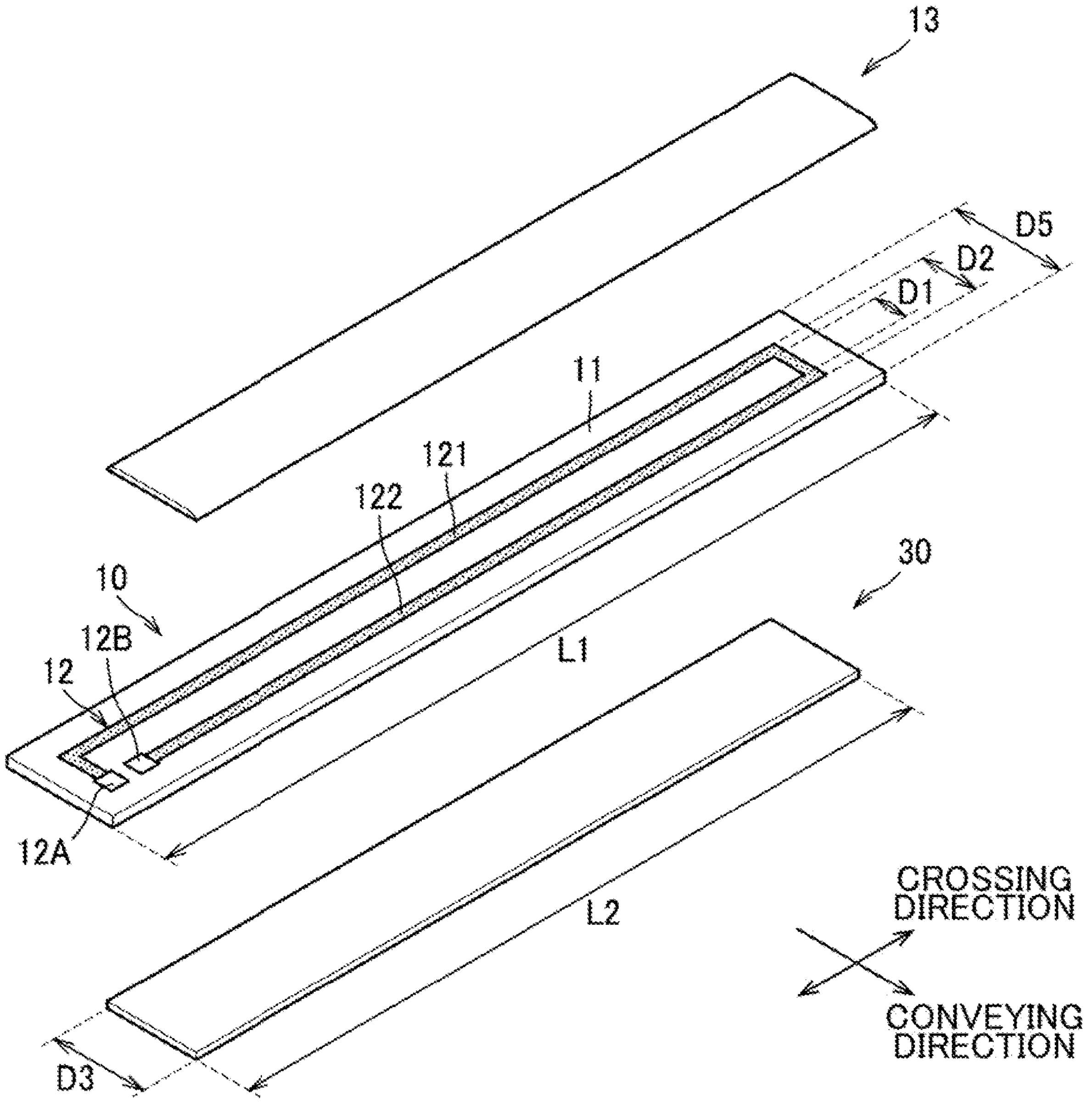
FIG. 2 is an exploded perspective view of a heater.

The heater 10 includes a substrate 11, a resistance heating element 12, and a cover 13. The heater 10 is accommodated inside the belt B. Note that, in the present disclosure, the expression "the heater 10 is accommodated inside the belt B" does not necessarily denote that the entire heater 10 is accommodated inside the belt B but specifies that at least part of the heater 10 is accommodated inside the belt B. As illustrated in FIG. 2, the substrate 11 is configured of a ceramic slender plate having an elongated rectangular shape. The heater 10 is what is commonly known as a ceramic heater. The substrate 11 extends in a crossing direction crossing a conveying direction in which the sheet S is conveyed. In the present embodiment, the crossing direction is orthogonal to the conveying direction of the sheet S. Hereinafter, the conveying direction of the sheet S will be simply referred to as the "conveying direction", and the crossing direction crossing the conveying direction will be simply referred to as the "crossing direction".

The resistance heating element 12 is provided on the substrate 11. The resistance heating element 12 is a heating resistor, for example. The resistance heating element 12 is formed on one surface of the substrate 11 by printing. The resistance heating element 12 includes a first terminal 12A, a second terminal 12B, a first heating pattern 121, and a second heating pattern 122. The first terminal 12A is provided at one end of the first heating pattern 121. The first terminal 12A is a terminal used for supplying electric power to the resistance heating element 12. The second terminal 12B is provided at one end of the second heating pattern 122. The second terminal 12B is a terminal used for supplying electric power to the resistance heating element 12. The first heating pattern 121 extends in the crossing direction crossing the conveying direction of the sheet S. The second heating pattern 122 extends in the crossing direction. The other end of the first heating pattern 121 and the other end of the second heating pattern 122 are electrically connected to each other. The second heating pattern 122 is positioned downstream relative to the first heating pattern 121 in the conveying direction. The second heating pattern 122 is positioned apart from the first heating pattern 121 in the conveying direction by a predetermined distance D1. The first heating pattern 121 is an example of the "first resistance heating element". The second heating pattern 122 is an example of the "second resistance heating element".

The cover 13 covers the resistance heating element 12. The cover 13 is made of glass, for example.

As illustrated in FIG. 1, the holder 20 is a member supporting the heater 10. The holder 20 includes a supporting portion 21 and guide portions 22. The supporting portion 21 has a plate-like shape corresponding to the shape of the heater 10. The supporting portion 21 has a supporting surface 21A supporting the heater 10 and the thermal conductive member 30. The guide portions 22 are provided at both end edges of the supporting portion 21 in the conveying direction. Each guide portion 22 has a guide surface 22G along the inner circumferential surface of the belt B.

The thermal conductive member 30 has a thermal conductivity that is greater than the thermal conductivity of the substrate 11. The thermal conductive member 30 has a plate-like shape or a sheet-like shape. The thermal conductive member 30 is a member for making uniform the temperature of the heater 10 in directions along the surface of the substrate 11 by conducting heat in directions parallel to the surface of the substrate 11, i.e., in the directions along the surface of the substrate 11. The thermal conductive member 30 is positioned between the heater 10 and the supporting portion 21 of the holder 20. When the sheet S is nipped by the heating unit 2 and the pressure rotary body 3, the thermal conductive member 30 is nipped by the heater 10 and the supporting portion 21.

The thermal conductive member 30 has a thermal conductivity in the directions along the surface of the substrate 11 that is greater than the thermal conductivity of the substrate 11 in the directions along the surface of the substrate 11. While there is no particular restriction on the material of the thermal conductive member 30, for example, the thermal conductive member 30 may be made of metal having a high thermal conductivity such as aluminum, aluminum alloy, or copper. Also, the thermal conductive member 30 may be a graphite sheet. In this case, the graphite sheet has a greater thermal conductivity in directions orthogonal to the thickness direction of the graphite sheet than in the thickness direction. In other words, the thermal conductivity of the graphite sheet in the directions orthogonal to the thickness direction is greater than the thermal conductivity of the graphite sheet in the thickness direction. Further, although there is no limitation on the thickness of the thermal conductive member 30, for example, the thermal conductive member 30 may be a film-like member that is thinner than 0.1 mm, or a plate-like member that is thicker than 1 mm.

The pressure rotary body 3 is a rotatable roller. The pressure rotary body 3 includes a shaft 3A and an elastic layer 3B. The shaft 3A has a columnar shape and is made of metal. The shaft 3A extends in the crossing direction. The elastic layer 3B is configured of an elastically deformable member and covers the shaft 3A. The pressure rotary body 3 is configured to form a nipping portion NP between the pressure rotary body 3 and the belt B by nipping the belt B in cooperation with the heater 10 between the pressure rotary body 3 and the heater 10. The nipping portion NP is a portion for applying heat and pressure to the sheet S. The nipping portion is a contact portion between the belt B and the pressure rotary body 3, i.e., a portion in which the belt B and the pressure rotary body 3 contact each other.

The pressure rotary body 3 is configured to be driven to rotate by receiving a driving force of a motor (not illustrated). When the pressure rotary body 3 is driven and rotates, the belt B rotates following the rotation of the pressure rotary body 3 by the friction force generated between the pressure rotary body 3 and the belt B (or the sheet S). Hence, the pressure rotary body 3 conveys the sheet S between the pressure rotary body 3 and the belt B. Accordingly, for example, when the sheet S having a toner image transferred thereon is conveyed between the pressure rotary body 3 and the heated belt B, the toner image is thermally fixed to the sheet S.

Hereinafter, the dimensions of the substrate 11, thermal conductive member 30 and nipping portion NP will be described. The thermal conductive member 30 has a dimension D3 in the conveying direction. The predetermined distance D1 described above is the distance in the conveying direction between an inward end edge 121A of the first heating pattern 121 and an inward end edge 122A of the second heating pattern 122. In the conveying direction, the dimension D3 of the thermal conductive member 30 is greater than the predetermined distance D1. Note that the inward end edge 121A of the first heating pattern 121 denotes the downstream end edge of the first heating pattern 121 in the conveying direction. The inward end edge 122A of the second heating pattern 122 denotes the upstream end edge of the second heating pattern 122 in the conveying direction.

Also, in the conveying direction, the dimension D3 of the thermal conductive member 30 is greater than a distance D2. The distance D2 is the distance in the conveying direction between an outward end edge 121B of the first heating pattern 121 (i.e., the upstream end edge of the first heating pattern 121 in the conveying direction) and an outward end edge 122B of the second heating pattern 122 (i.e., the downstream end edge of the second heating pattern 122 in the conveying direction).

The nipping portion NP has a dimension D4 in the conveying direction. In the conveying direction, the dimension D3 of the thermal conductive member 30 is smaller than or equal to the dimension D4 of the nipping portion NP. Note that, when a configuration is employed that can change the dimension D4 of the nipping portion NP by moving at least one of the heating unit 2 and the pressure rotary body 3, the above-described comparison between the dimensions D3 and D4 is based on the assumption that the dimension D4 is the maximum dimension of the nipping portion NP in the conveying direction.

The substrate 11 has a dimension D5 in the conveying direction. In the conveying direction, the dimension D3 of the thermal conductive member 30 is greater than or equal to 40% (forty percent) of the dimension D5 of the substrate 11. Also, in the conveying direction, the dimension D3 of the thermal conductive member 30 is smaller than or equal to the dimension D5 of the substrate 11.

In the conveying direction, the dimension D5 of the substrate 11 is greater than the dimension D4 of the nipping portion NP.

As illustrated in FIG. 2, the substrate 11 has a dimension L1 in the crossing direction, and the thermal conductive member 30 has a dimension L2 in the crossing direction. In the crossing direction, the dimension L2 of the thermal conductive member 30 is smaller than the dimension L1 of the substrate 11.

In the fixing device 1 according to the first embodiment described above, the following technical advantages can be attained. In the fixing device 1, in the conveying direction, the dimension D3 of the thermal conductive member 30 is greater than the predetermined distance D1 and is smaller than the dimension D4 of the nipping portion NP. This configuration can suppress the thermal conductive member 30 from conducting heat to the outside of the nipping portion NP, thereby making the heat distribution of the heater 10 uniform while suppressing the thermal conductive member 30 from removing heat greater than necessary. Hence, the heater 10 is suppressed from losing heat greater than necessary, thereby resulting in saving electric power.

Also, in the crossing direction, the dimension L2 of the thermal conductive member 30 is smaller than the dimension L1 of the substrate 11. This configuration can suppress the thermal conductive member 30 from removing heat greater than necessary from the heater 10.

<Modifications and Variations>

Figure 3:
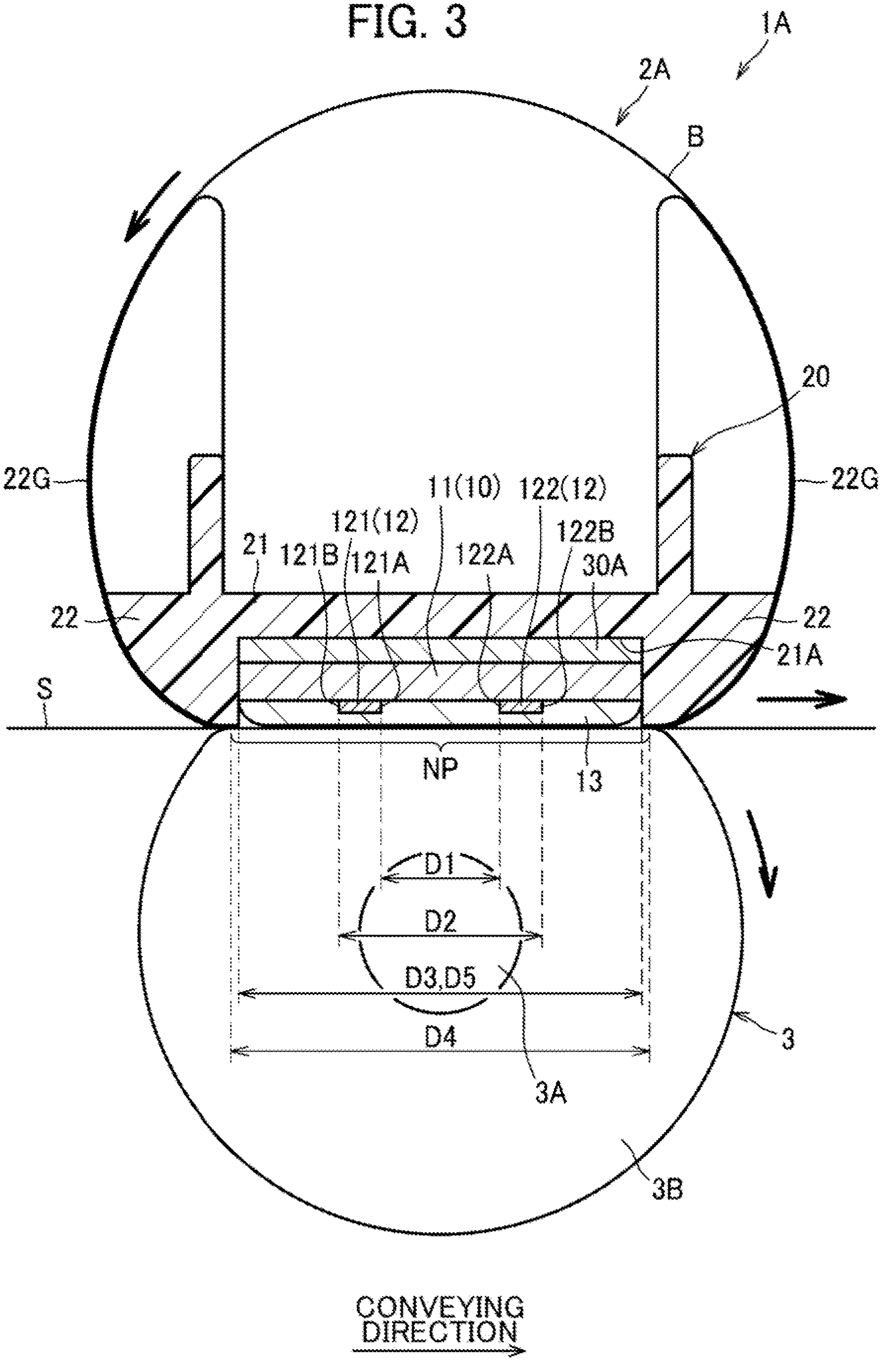
FIG. 3 is a cross-sectional view of a heating unit.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, FIG. 3 illustrates a fixing device 1A according to a second embodiment. The fixing device 1A is provided with a heating unit 2A including a thermal conductive member 30A. As in the heating unit 2A illustrated in FIG. 3, in the conveying direction, the dimension D4 of the nipping portion NP may be greater than the predetermined distance D1 and greater than or equal to the dimension D3 of the thermal conductive member 30A. Further, in the conveying direction, the dimension D4 of the nipping portion NP is greater than the distance D2 between the outward end edge 121B of the first heating pattern 121 and the outward end edge 122B of the second heating pattern 122. Note that, in the conveying direction, the dimension D3 of the thermal conductive member 30A is equal to the dimension D5 of the substrate 11 in the second embodiment.

In the second embodiment, since in the conveying direction the dimension D4 of the nipping portion NP is greater than or equal to the dimension D3 of the thermal conductive member 30A, the thermal conductive member 30A can be suppressed from conducting heat to the outside of the nipping portion NP. Accordingly, the thermal conductive member 30A can be suppressed from removing heat greater than necessary from the heater 10 while making uniform the heat distribution in an appropriate region of the heater 10 that corresponds to the nipping portion NP.

Figure 4:
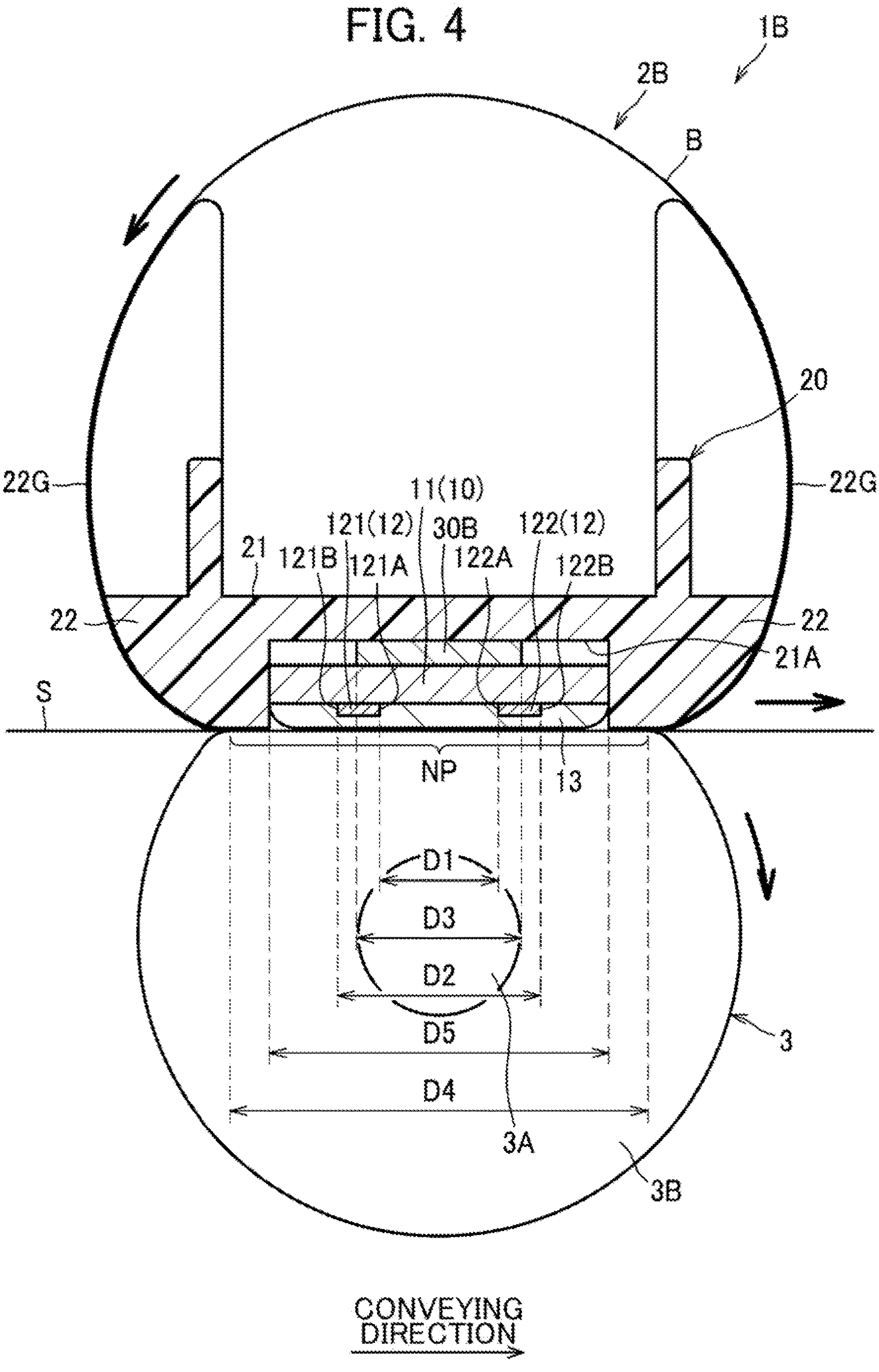
FIG. 4 is a cross-sectional view of a heating unit.

For example, FIG. 4 illustrates a fixing device 1B according to a third embodiment. The fixing device 1B is provided with a heating unit 2B including a thermal conductive member 30B. As in the heating unit 2B illustrated in FIG. 4, in the conveying direction, the dimension D3 of the thermal conductive member 30B may be greater than or equal to the predetermined distance D1 between the inward end edge 121A of the first heating pattern 121 and the inward end edge 122A of the second heating pattern 122 and smaller than or equal to the distance D2 between the outward end edge 121B of the first heating pattern 121 and the outward end edge 122B of the second heating pattern 122. In the third embodiment, the pressure rotary body 3 is configured to form the nipping portion NP between the pressure rotary body 3 and the belt B by nipping the belt B in cooperation with the heater 10 and holder 20 between the pressure rotary body 3 and the heater 10 and holder 20. In the third embodiment, since in the conveying direction the dimension D4 of the nipping portion NP is greater than or equal to the dimension D3 of the thermal conductive member 30B, the thermal conductive member 30B can be suppressed from removing heat greater than necessary from the heater 10 while making uniform the heat distribution in an appropriate region of the heater 10 that corresponds to the nipping portion NP.

Figure 5:
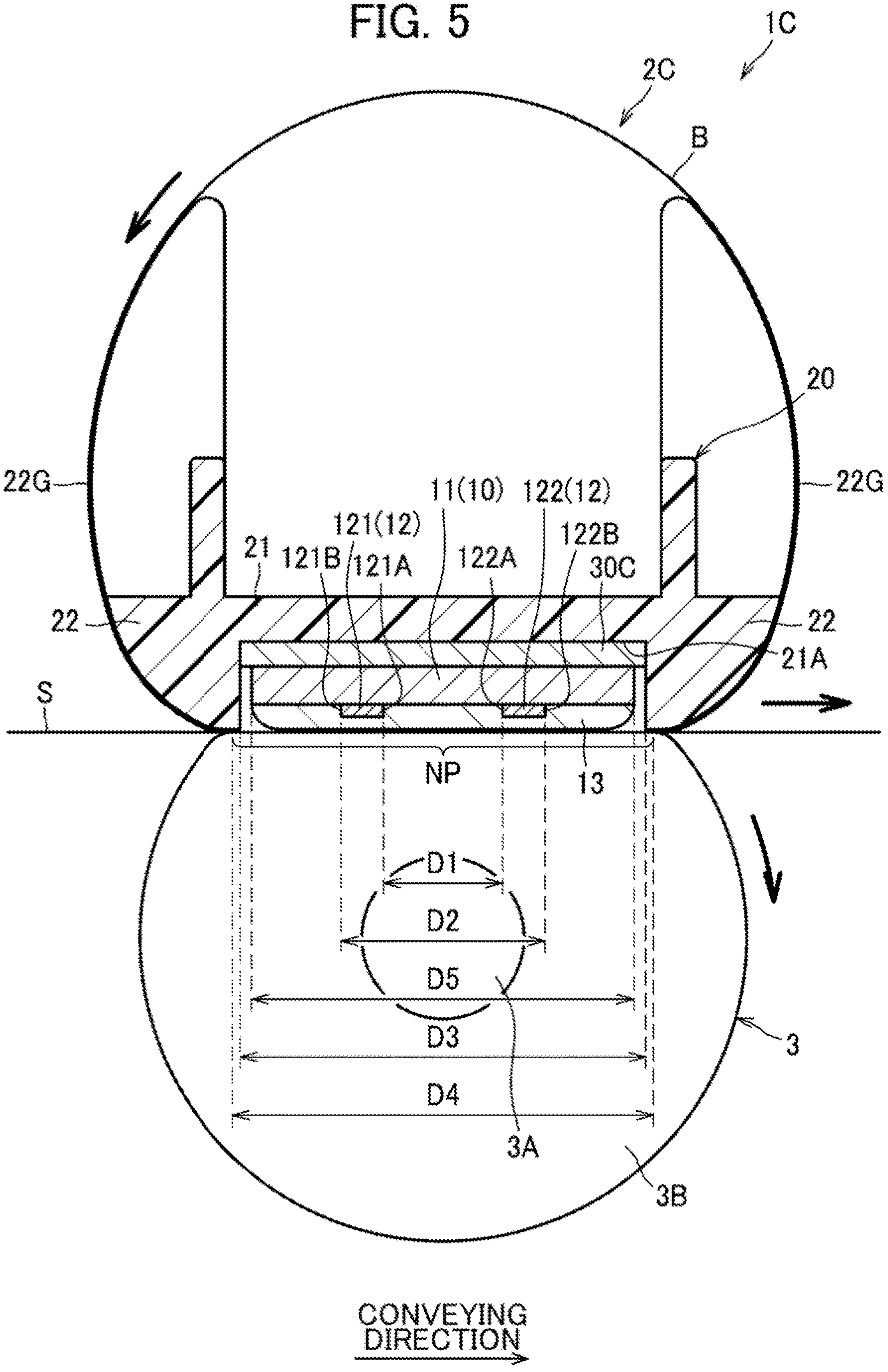
FIG. 5 is a cross-sectional view of a heating unit.

For example, FIG. 5 illustrates a fixing device 1C according to the fourth embodiment. The fixing device 1C is provided with a heating unit 2C including a thermal conductive member 30C. As in the heating unit 2C illustrated in FIG. 5, in the conveying direction, the dimension D3 of the thermal conductive member 30C may be greater than the dimension D5 of the substrate 11. In the fourth embodiment, since the dimension D4 of the nipping portion NP is greater than the dimension D3 of the thermal conductive member 30C, the thermal conductive member 30C can be suppressed from conducting heat to the outside of the nipping portion NP. Thus, the thermal conductive member 30C can be suppressed from removing heat greater than necessary from the heater 10 while making uniform the heat distribution in an appropriate region of the heater 10.

In the embodiments described above, the resistance heating element 12 includes the two heating patterns extending in the crossing direction. However, the number of the heating patterns is not limited to a particular number, but may be three or more.

Figure 6A:
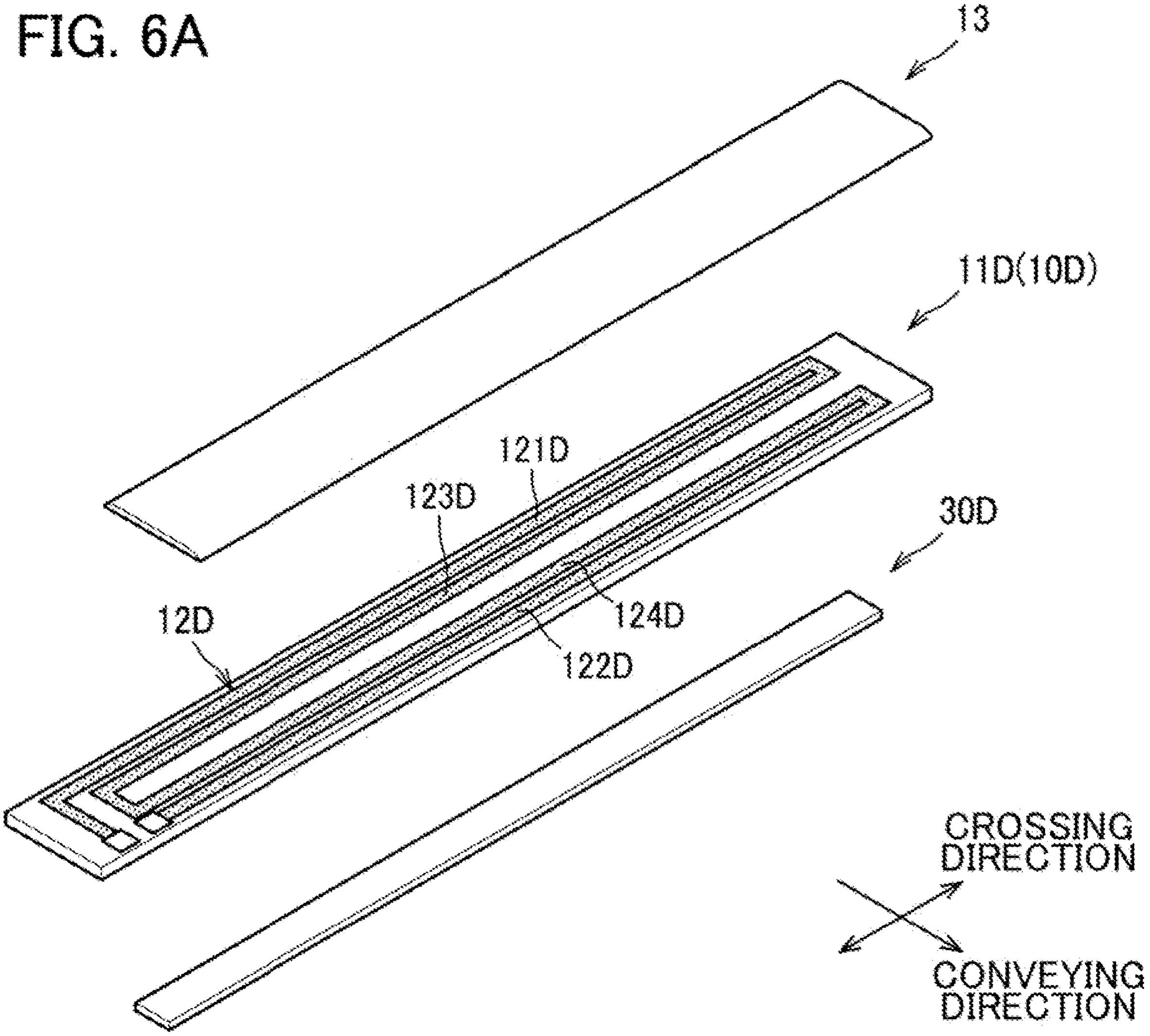
FIG. 6A is an exploded perspective view of a heater having four heating patterns.
Figure 6B:
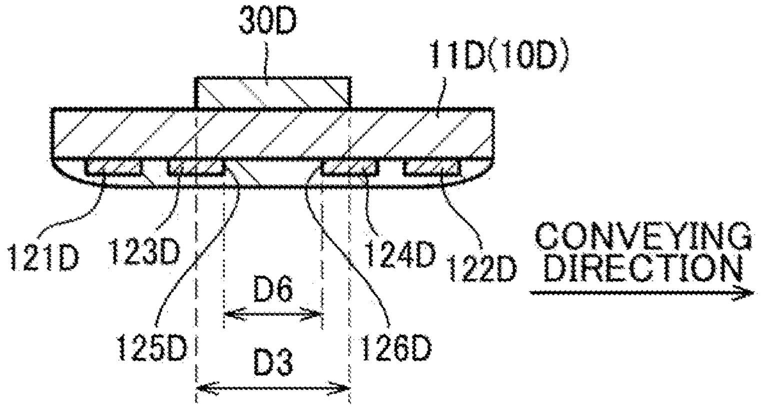
FIG. 6B is a cross-sectional view of the heater depicted in FIG. 6A.

For example, FIGS. 6A and 6B illustrate part of a fixing device according to a variation of the embodiments. The fixing device in this variation is provided with a heater 10D and a thermal conductive member 30D. The heater 10D includes a substrate 11D and a resistance heating element 12D provided thereon. The resistance heating element 12D has four heating patterns. Specifically, the resistance heating element 12D includes a first heating pattern 121D, a second heating pattern 122D, a third heating pattern 123D, and a fourth heating pattern 124D, each of which extends in the crossing direction. These four heating patterns (i.e., the first heating pattern 121D, second heating pattern 122D, third heating pattern 123D, and fourth heating pattern 124D) are electrically connected so that the four heating patterns can generate heat. The third heating pattern 123D and fourth heating pattern 124D are positioned between the first heating pattern 121D and the second heating pattern 122D in the conveying direction. In this configuration, the dimension D3 of the thermal conductive member 30D is greater than a predetermined distance D6, which is the distance between an inward end edge 125D (i.e., the downstream end edge in the conveying direction) of the third heating pattern 123D and an inward end edge 126D (i.e., the upstream end edge in the conveying direction) of the fourth heating pattern 124D. In this variation, the dimension D3 of the thermal conductive member 30D is smaller than the dimension D4 of the nipping portion NP, and accordingly, the thermal conductive member 30D can be suppressed from conducting heat to the outside of the nipping portion NP. Hence, the thermal conductive member 30D can be suppressed from removing heat greater than necessary from the heater 10D while making uniform the heat distribution in an appropriate region of the heater 10D. The third heating pattern 123D is an example of the “first resistance heating element”. The fourth heating pattern 124D is an example of the “second resistance heating element”.

In the resistance heating element 12 in the above-mentioned embodiments, the first terminal 12A is provided at one end portion of the first heating pattern 121, the second terminal 12B is provided at one end portion of the second heating pattern 122, and the other end portion of the first heating pattern 121 and the other end portion of the second heating pattern 122 are electrically connected to each other. However, the resistance heating element 12 is not limited to this configuration.

Figure 7A:
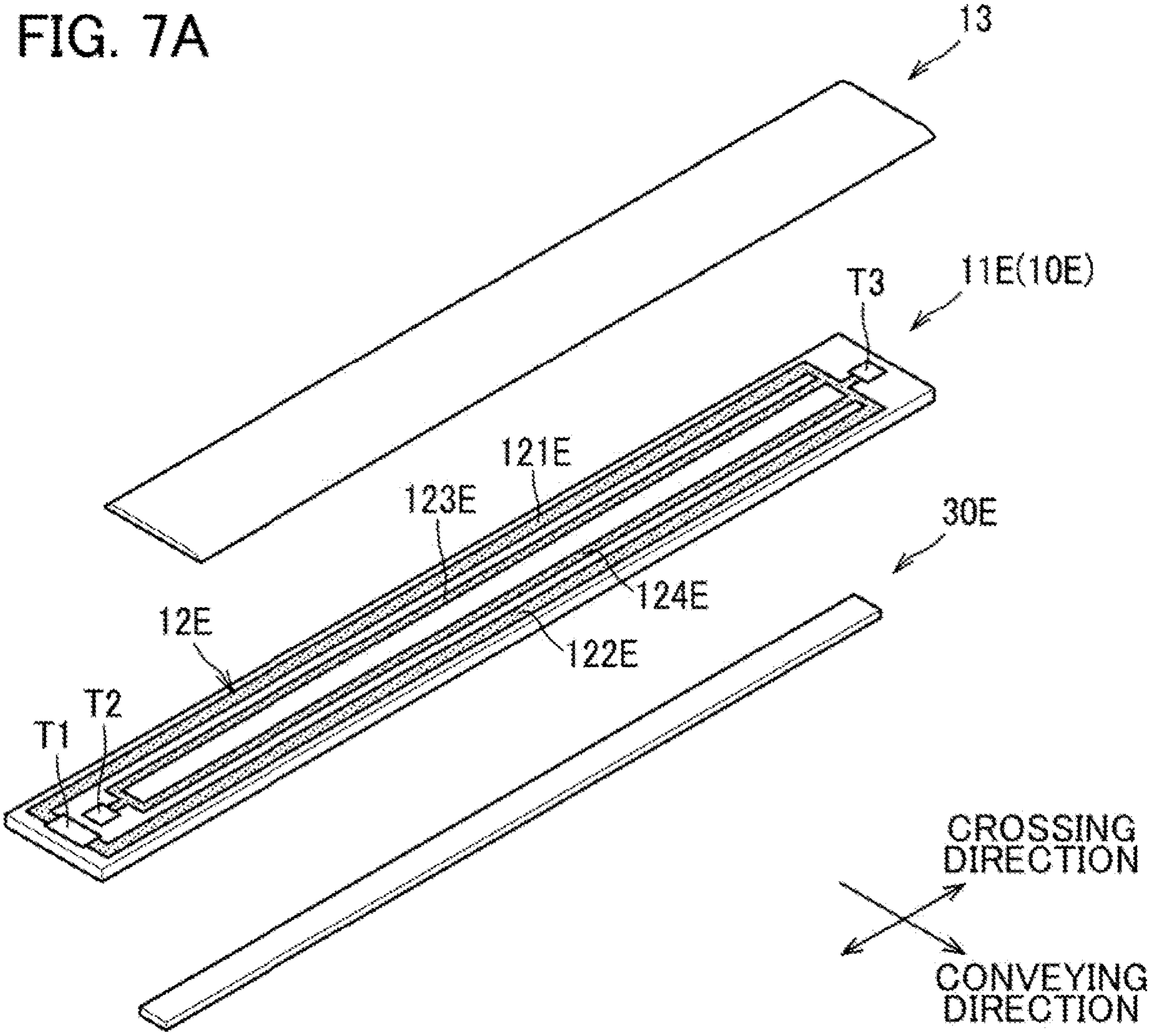
FIG. 7A is an exploded perspective view of a heater including a resistance heating element having terminals at both end portions thereof.
Figure 7B:
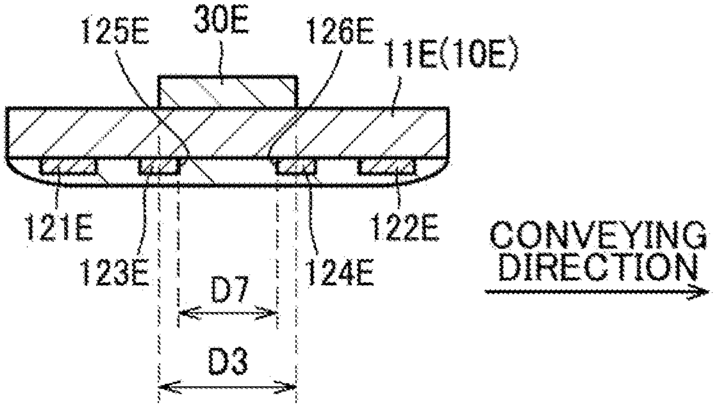
FIG. 7B is a cross-sectional view of the heater depicted in FIG. 7A.

For example, FIGS. 7A and 7B illustrate part of a fixing device according to another variation of the embodiments. The fixing device in this variation is provided with a heater 10E and a thermal conductive member 30E. The heater 10E includes a substrate 11E and a resistance heating element 12E provided thereon. The resistance heating element 12E includes a first heating pattern 121E, a second heating pattern 122E, a third heating pattern 123E, a fourth heating pattern 124E, a first terminal T1, a second terminal T2, and a third terminal T3. The first terminal T1 is provided at one end of both the first heating pattern 121E and the second heating pattern 122E. In other words, one end of the first heating pattern 121E and one end of the second heating pattern 122E are both connected to the first terminal T1. The second terminal T2 is provided at one end of both the third heating pattern 123E and the fourth heating pattern 124E. In other words, one end of the third heating pattern 123E and one end of the fourth heating pattern 124E are both connected to the second terminal T2. The third terminal T3 is provided at the other end of all of the first heating pattern 121E, second heating pattern 122E, third heating pattern 123E, and fourth heating pattern 124E. In other words, the other end of the first heating pattern 121E, the other end of the second heating pattern 122E, the other end of the third heating pattern 123E, and the other end of the fourth heating pattern 124E are all connected to the third terminal T3. In this configuration, the dimension D3 of the thermal conductive member 30E is greater than a predetermined distance D7, which is the distance between an inward end edge 125E (i.e., the downstream end edge in the conveying direction) of the third heating pattern 123E and an inward end edge 126E (i.e., the upstream end edge in the conveying direction) of the fourth heating pattern 124E. In this variation, the dimension D3 of the thermal conductive member 30E is smaller than the dimension D4 of the nipping portion NP, and accordingly, the thermal conductive member 30E can be suppressed from conducting heat to the outside of the nipping portion NP. Hence, the thermal conductive member 30E can be suppressed from removing heat greater than necessary from the heater 10E while making uniform the heat distribution in an appropriate region of the heater 10E. The third heating pattern 123E is an example of the “first resistance heating element”. The fourth heating pattern 124E is an example of the “second resistance heating element”.

In the embodiments described above, the thermal conductive member 30 is configured of a single sheet-like member, but the thermal conductive member 30 may be configured of a combination of a plurality of sheet-like members. In this case, the material, thermal conductivity, and shape of the plurality of sheet-like members may be different from one another. Also, the material, thermal conductivity, and shape of the plurality of sheet-like members may be the same as one another.

In the embodiments described above, the substrate 11 of the heater 10 is the ceramic plate having the rectangular shape elongated in the crossing direction. However, provided that the substrate 11 has a thermal conductivity that is smaller than the thermal conductivity of the thermal conductive member 30, the substrate 11 may be a slender metal plate (e.g., a slender stainless plate) having an elongated rectangular shape.

The elements described in connection with the embodiments and modifications thereto may be combined as appropriate.

What is claimed is:

1. A fixing device comprising:

a heating rotary body;

a pressure rotary body configured to:

form a nipping portion between the pressure rotary body and the heating rotary body; and convey a sheet in a conveying direction while nipping the sheet between the pressure rotary body and the heating rotary body, a heater accommodated inside the heating rotary body, the heater including:

a substrate having a first surface and a second surface opposite the first surface;

a first resistance heating element extending in a crossing direction crossing the conveying direction, the first resistance heating element being provided on the first surface of the substrate; and a second resistance heating element extending in the crossing direction and provided on the first surface of the substrate, the second resistance heating element being positioned apart from the first resistance heating element by a predetermined distance in the conveying direction; and a thermal conductive member in contact with the second surface of the substrate, wherein, in the conveying direction, the thermal conductive member has a dimension that is greater than a distance between an outward end edge of the first resistance heating element and an outward end edge of the second resistance heating element, and the dimension of the thermal conductive member is smaller than or equal to a dimension of the substrate.

2. The fixing device according to claim 1, wherein, in the conveying direction, the dimension of the substrate is greater than a dimension of the nipping portion.

3. The fixing device according to claim 1, wherein, in the conveying direction, the nipping portion has a dimension that is greater than the predetermined distance and is greater than or equal to the dimension of the thermal conductive member.

4. The fixing device according to claim 1, wherein, in the conveying direction, the dimension of the thermal conductive member is greater than or equal to 40% of the dimension of the substrate.

5. The fixing device according to claim 1, wherein, in the crossing direction, the dimension of the thermal conductive member is smaller than the dimension of the substrate.

6. The fixing device according to claim 1, wherein the thermal conductive member is a plate-like member made of one of aluminum, an aluminum alloy, and copper.

7. A fixing device, comprising:

a heating rotary body;

a pressure rotary body configured to:

form a nipping portion between the pressure rotary body and the heating rotary body; and convey a sheet in a conveying direction while nipping the sheet between the pressure rotary body and the heating rotary body, a heater accommodated inside the heating rotary body, the heater including:

a substrate having a first surface and a second surface opposite the first surface;

a first resistance heating element extending in a crossing direction crossing the conveying direction, the first resistance heating element being provided on the first surface of the substrate; and a second resistance heating element extending in the crossing direction and provided on the first surface of the substrate, the second resistance heating element being positioned apart from the first resistance heating element by a predetermined distance in the conveying direction; and a thermal conductive member in contact with the second surface of the substrate, wherein, in the conveying direction, the thermal conductive member has a dimension that is greater than the predetermined distance and smaller than or equal to a dimension of the nipping portion, wherein the thermal conductive member is a graphite sheet, and wherein a thermal conductivity of the graphite sheet in a direction orthogonal to a thickness direction of the graphite sheet is greater than a thermal conductivity of the graphite sheet in the thickness direction.

8. The fixing device according to claim 1, wherein, in the conveying direction, the nipping portion has a dimension that is greater than the distance between the outward end edge of the first resistance heating element and the outward end edge of the second resistance heating element.

9. A fixing device comprising:

a belt;

a pressure roller configured to:

form a nipping portion between the pressure roller and the belt; and convey a sheet in a conveying direction while nipping the sheet between the pressure roller and the belt;

a heater accommodated inside the belt, the heater including:

a substrate having a first surface and a second surface opposite the first surface;

a first resistance heating element extending in a crossing direction crossing the conveying direction, the first resistance heating element being provided on the first surface of the substrate; and a second resistance heating element extending in the crossing direction and provided on the first surface of the substrate, the second resistance heating element being positioned apart from the first resistance heating element by a predetermined distance in the conveying direction; and a thermal conductive plate in contact with the second surface of the substrate, wherein, in the conveying direction, the thermal conductive plate has a dimension that is greater than a distance between an outward end edge of the first resistance heating element and an outward end edge of the second resistance heating element, and the dimension of the thermal conductive plate is smaller than or equal to a dimension of the substrate.

10. The fixing device according to claim 9, wherein, in the conveying direction, the dimension of the substrate is greater than a dimension of the nipping portion.

11. The fixing device according to claim 9, wherein, in the conveying direction, the nipping portion has a dimension that is greater than the predetermined distance and is greater than or equal to the dimension of the thermal conductive plate.

12. The fixing device according to claim 9, wherein, in the conveying direction, the dimension of the thermal conductive plate is greater than or equal to 40% of the dimension of the substrate.

13. The fixing device according to claim 9, wherein, in the crossing direction, the dimension of the thermal conductive plate is smaller than the dimension of the substrate.

14. The fixing device according to claim 9, wherein the thermal conductive plate is made of one of aluminum, an aluminum alloy, and copper.

15. The fixing device according to claim 9, wherein the thermal conductive plate is a graphite sheet, and wherein a thermal conductivity of the graphite sheet in a direction orthogonal to a thickness direction of the graphite sheet is greater than a thermal conductivity of the graphite sheet in the thickness direction.

* * * * *